Patented June 28, 1927.

1,634,222

UNITED STATES PATENT OFFICE.

DONALD K. TRESSLER, OF PITTSBURGH, PENNSYLVANIA, ASSIGNOR TO LARROWE CONSTRUCTION COMPANY, OF DETROIT, MICHIGAN, A CORPORATION OF MICHIGAN.

PROCESS OF PREPARING BETAINE HYDROCHLORIDE.

No Drawing.   Application filed July 13, 1925. Serial No. 43,395.

This invention relates to the manufacture of betaine hydrochloride, potassium chloride and glutamic acid from the residual liquors of the beet sugar industry remaining after the separation and recovery of available sugar from the molasses.

It has hitherto been proposed to add hydrochloric acid in a concentrated or gaseous state to desaccharified beet molasses in order to convert betaine and other products into the form of hydrochlorides and chlorides. The use of concentrated hydrochloric acid has the disadvantage that it introduces considerable water with resulting dilution. When hydrochloric gas is used a separate plant is required for generating it, e. g., from sodium chloride and sulfuric acid. The present invention makes unnecessary the generation of hydrochloric acid gas and avoids the addition of concentrated hydrochloric acid.

According to the present invention desaccharified beet molasses or the distillery slops or vinasses remaining after the fermentation thereof, is treated with the chloride of a metal that forms an insoluble salt with sulfuric acid and with sulfuric acid to react therewith to form and precipitate out the insoluble sulfate, thus forming hydrochloric acid in the solution. Upon standing the insoluble sulfate together with betaine hydrochloride, potassium chloride, and sodium chloride separates out and may be obtained by filtration.

Among the metal chlorides that may be used to react with the sulfuric acid to form insoluble sulfates may be mentioned particularly the alkali earth metal chlorides of which calcium chloride is particularly advantageous because of its non-poisonous character and its availability at low cost. If calcium chloride is used, it reacts with the sulfuric acid to form calcium sulfate or gypsum and hydrochloric acid. The hydrochloric acid is thus formed in the solution where it can react directly with the betaine, etc.

The residual waters or waste waters which are treated in the process of the present invention are those remaining after the separation of crystallizable sugar from beet molasses. The maximum quantity of available sucrose is usually extracted from the molasses by a suitable saccharate process such as the Steffens process. The residue is the waste water which contains the non-sugars. On the dry basis, this waste water contains approximately 20% of glutamic acid, 20% betaine and 35% of inorganic salt, chiefly potassium salts. The molasses is sometimes used as a source of alcohol and yeast leaving distillery slops or vinasses, which similarly contain the non-sugars of the molasses. Such residual liquors, after suitable concentration when necessary, are utilized in carrying out the process of the present invention.

The metal chloride may be added first to the waste liquor and the concentrated sulfuric acid subsequently added; or the sulfuric acid may be added first and the chloride then added; or small amounts of the chloride and acid may be added alternately until the total amount required has been added. The solution is cooled and kept cool during the addition of the concentrated sulfuric acid. By keeping the solutions cool during the formation of the hydrochloric acid from the chloride and sulfuric acid, the glutamic acid remains in solution (presumably in the form of a hydrolyzable compound soluble in the acid solution). If the solution is heated, such glutamic acid compound or compounds will be converted into the form of glutamic acid hydrochloride, which will likewise be precipitated along with the betaine hydrochloride. However, by keeping the solution cool, such formation of glutamic acid hydrochloride is avoided and only betaine hydrochloride and the inorganic chlorides are precipitated along with the insoluble sulfate. The present invention can be practiced with heating of the solution due to the heat of solution of the sulfuric acid and the heat of the reaction of the acid with the chloride supplemented by extraneous heat if desired; and by heating the solution the glutamic acid hydrochloride can be obtained in the first precipitate along with the metal chloride, betaine hydrochloride, etc.

This invention is of particular advantage, however, in carrying out of such a process as that of my companion application, Serial No. 723,684, filed July 2, 1924, in which the action of the hydrochloric acid is carried out at low temperature such that glutamic acid hydrochloride is not precipitated; and with subsequent heating of the solution, after the separation of betaine hydrochloride, etc. to hydrolyze the glutamic acid compounds and precipitate the glutamic acid hydrochloride. By carrying out the process in this way a high yield of betaine hydrochloride is obtained without the use of gaseous hydrochloric acid and with the use of inexpensive chemicals, which, however, are removed from the solution in the form of the insoluble sulfate so that the solution is left in a form which facilitates the recovery of other substances, such as glutamic acid hydrochloride.

The invention will be further illustrated by the following specific example, but it will be understood that the invention is not limited thereto. The parts are by weight.

1,000 parts of concentrated Steffens waste water of specific gravity about 1.29 are cooled to 15° C. Then 306 parts of powdered anhydrous calcium chloride are slowly dissolved in it. The solution is again cooled to 15° C. and kept at this temperature during the addition of about 300 parts of concentrated sulfuric acid of 1.84 specific gravity and the solution is then permitted to stand. After about 36 hours, the mixed crystals are separated from the solution in a basket centrifuge. These mixed crystals contain the betaine hydrochloride together with potassium chloride and the insoluble sulfate. The betaine hydrochloride is extracted from the mixture with hot methanol and is recovered therefrom by crystallization. The residual crystals contain approximately 50% of potassium chloride and may be used as fertilizer or for the separation of pure potassium salts.

After the separation of the mixed crystals from the solution, it may advantageously be heated, e. g., to about 80° C. for about two hours and then cooled. This results in the conversion of the glutamic acid into the hydrochloride which is separated together with free carbon. This method of forming and separating the glutamic acid hydrochloride from the mother liquor by heating it after the betaine hydrochloride and potassium chloride have been separated is also described in my said prior application, Serial No. 723,684. The mixture of glutamic acid, hydrochloride and carbon may be extracted with water, preferably hot water, to dissolve the glutamic acid hydrochloride. This solution may then be decolorized with activated carbon or bone-black and pure glutamic acid may then be obtained by adding just sufficient alkali or alkali carbonate to neutralize the hydrochloric acid of the hydrochloride thus precipitating free acid, or the glutamic acid may be precipitated as a hydrochloride by saturating the solution with gaseous hydrochloric acid.

It will thus be seen that the present invention provides a novel and advantageous method of treating waste liquors from beet sugar molasses, such as Steffens waste water or distillery slops, with reagents which react to form hydrochloric acid in the liquor and which reagents also react to form an insoluble sulfate, thus eliminating from the solution the sulfuric acid radical and also the metal radical of the metal chloride employed. When calcium chloride is used as the metal chloride, it reacts to form calcium sulfate or gypsum. The process is an inexpensive one in that inexpensive chemicals are required, while a high yield of betaine hydrochloride may nevertheless be obtained without the use of gaseous hydrochloric acid. The formation of the hydrochloric acid and of the insoluble metal sulfate in the waste liquor will, if the liquor is heated, give glutamic acid hydrochloride along with the betaine hydrochloride and the insoluble sulfate; but by keeping the temperature low the formation of the glutamic acid hydrochloride can be prevented and the betaine hydrochloride obtained as a precipitate admixed with the potassium chloride and the insoluble sulfate, from which the betaine hydrochloride may be readily separated. Thereafter the glutamic acid can be obtained by heating the mother liquor to form and precipitate glutamic acid hydrochloride which may then be recovered as such or in a purified state or in the form of the free acid.

The present invention includes the novel method of bringing about the formation of the hydrochloric acid in the waste liquor from the metal chloride and the sulfuric acid irrespective of whether the solution is kept cold or heated and irrespective of whether the betaine hydrochloride is precipitated without admixture of glutamic acid hydrochloride or free from such admixture; but the method is advantageously carried out at low temperature with prevention of formation and precipitation of glutamic acid hydrochloride until the betaine hydrochloride has been precipitated along with potassium chloride and the insoluble sulfate; after which the mother liquor is advantageously heated to form and precipitate glutamic acid hydrochloride.

In my companion application, Serial No. 43,396, filed of even date, I have described and claimed the process in which an acid and a chloride are added to the concentrated residual liquors of beet molasses, and in such application I have claimed specifically the process in which hydrochloric acid and a chloride are so added. The process of the present application is included within the generic claims of said companion application, but is directed specifically to a process in which sulphuric acid and a chloride are employed.

I claim:

1. The method of treating concentrated residual liquors of beet molasses which comprises adding thereto and causing to react therein concentrated sulfuric acid and a chloride of a metal forming an insoluble sulfate, with the resulting production in the liquor of hydrochloric acid and the insoluble metal sulfate.

2. The method of treating concentrated residual liquors of beet molasses which comprises adding thereto and causing to react therein concentrated sulfuric acid and a chloride of a metal forming an insoluble sulfate, with the resulting production in the liquor of hydrochloric acid and the insoluble metal sulfate, the liquor being kept cool during such reaction, and the amount of hydrochloric acid formed being sufficient to precipitate betaine hydrochloride and potassium chloride.

3. The method of treating concentrated residual liquors of beet molasses which comprises adding thereto sulfuric acid and calcium chloride with resulting formation in the liquor of hydrochloride acid and calcium sulfate.

4. The method of treating concentrated residual liquors of beet molasses which comprises adding thereto sulfuric acid and calcium chloride with resulting formation in the liquor of hydrochloric acid and calcium sulfate, the liquor being kept cool during such formation of hydrochloric acid and the amount of such acid being sufficient to precipitate betaine hydrochloride and potassium chloride.

5. The method of treating concentrated residual liquors of beet molasses which comprises causing concentrated sulfuric acid and a chloride of a metal forming an insoluble sulfate to react therein at a low temperature with resulting formation of the insoluble sulfate and of hydrochloric acid in sufficient amount to precipitate betaine hydrochloride and potassium chloride, separating the precipitated material and subsequently heating the mother liquor to precipitate glutamic acid hydrochloride therefrom.

6. The method of treating concentrated residual liquors of beet molasses which comprises causing concentrated sulfuric acid and a chloride of a material forming an insoluble sulfate to react therein with the resulting production of the insoluble sulfate and of hydrochloric acid in sufficient amount to precipitate betaine hydrochloride and potassium chloride, separating the resulting precipitate containing the insoluble sulfate, betaine hydrochloride, and potassium chloride from the liquor and extracting the betaine hydrochloride from the mixed precipitate by means of a solvent.

In testimony whereof I affix my signature.

DONALD K. TRESSLER.